US012568401B2

(12) United States Patent (10) Patent No.: US 12,568,401 B2
Panchal et al. (45) Date of Patent: Mar. 3, 2026

(54) DISTRIBUTED NETWORK MANAGEMENT SYSTEM

(71) Applicant: Apple Inc., Cupertino, CA (US)

(72) Inventors: Ajay Panchal, San Diego, CA (US); Ayman F. Naguib, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 18/220,674

(22) Filed: Jul. 11, 2023

(65) Prior Publication Data

US 2024/0015595 A1 Jan. 11, 2024

Related U.S. Application Data

(60) Provisional application No. 63/359,976, filed on Jul. 11, 2022.

(51) Int. Cl.
H04W 28/16 (2009.01)
(52) U.S. Cl.
CPC .................................. H04W 28/16 (2013.01)
(58) Field of Classification Search
CPC ..... H04W 28/16; H04W 84/06; H04W 24/02; H04W 88/06; H04W 72/046
See application file for complete search history.

(56) References Cited

U.S. PATENT DOCUMENTS 7,131,120 B2 * 10/2006 Veselov ..................... G06F 9/52
717/121
2003/0037125 A1 * 2/2003 Luman .................. H04W 16/00
709/229

2006/0150244 A1 * 7/2006 Klein .................. H04L 12/2803
726/12
2012/0176976 A1 * 7/2012 Wells ................ H04W 52/0219
370/329
2015/0271331 A1 * 9/2015 Segre .................. H04L 67/1001
379/265.09
2019/0379664 A1 * 12/2019 Suthar ................... H04L 9/3239
2020/0383002 A1 * 12/2020 Dolfini .................. H04W 48/16
(Continued)

OTHER PUBLICATIONS

Ferdous et al., "Blockchain Consensus Algorithms: A Survey," CoRR, Submitted on Jan. 20, 2020, arXiv:2001.07091, 39 pages.
(Continued)

*Primary Examiner* — Christine Ng
(74) *Attorney, Agent, or Firm* — Fish & Richardson P.C.

(57) ABSTRACT

An example system includes a distributed network having a first computer system communicatively coupled to a first set of network nodes, and a second computer system communicatively coupled to a second set of network nodes. The first computer system receives first data from a first network node representing a request for additional network resources; receives second data from the second computer system representing a first set of network resources available for sharing by a second network node; identifies at least a portion of the first set of network resources; transmits, to the first network node and the second computer system, first transaction data representing a sharing of at least the portion of the first set of network resources by the second network node with the first network node; and adds the first transaction data to a distributed ledger of the distributed network.

20 Claims, 9 Drawing Sheets

650

652 — RECEIVE, BY A FIRST COMPUTER SYSTEM OF A DISTRIBUTED NETWORK, FIRST DATA FROM A FIRST NETWORK NODE, WHEREIN THE DISTRIBUTED NETWORK INCLUDES (i) THE FIRST COMPUTER SYSTEM COMMUNICATIVELY COUPLED TO A FIRST SET OF NETWORK NODES INCLUDING THE FIRST COMPUTER SYSTEM, AND (ii) A SECOND COMPUTER SYSTEM COMMUNICATIVELY COUPLED TO A SECOND SET OF NETWORK NODES, AND WHEREIN THE FIRST DATA REPRESENTS A REQUEST FOR ADDITIONAL NETWORK RESOURCES BY THE FIRST NETWORK NODE

654 — RECEIVE, BY THE FIRST COMPUTER SYSTEM, SECOND DATA FROM THE SECOND COMPUTER SYSTEM, THE SECOND DATA REPRESENTING A FIRST SET OF NETWORK RESOURCES AVAILABLE FOR SHARING BY A SECOND NETWORK NODE FROM THE SECOND SET OF NETWORK NODES

656 — IDENTIFY, BY THE FIRST COMPUTER SYSTEM, AND BASED ON THE FIRST DATA AND THE SECOND, AT LEAST A PORTION OF THE FIRST SET OF NETWORK RESOURCES

658 — TRANSMIT, BY THE FIRST COMPUTER SYSTEM TO THE FIRST NETWORK NODE AND THE SECOND COMPUTER SYSTEM, FIRST TRANSACTION DATA REPRESENTING A SHARING OF AT LEAST THE PORTION OF THE FIRST SET OF NETWORK RESOURCES BY THE SECOND NETWORK NODE WITH THE FIRST NETWORK NODE

670 — ADD, BY THE FIRST COMPUTER SYSTEM, THE FIRST TRANSACTION DATA TO A DISTRIBUTED LEDGER OF THE DISTRIBUTED NETWORK

(56) References Cited

U.S. PATENT DOCUMENTS

| | | | |
|---|---|---|---|
| 2021/0212043 A1* | 7/2021 | Ryu | ...................... H04L 67/104 |
| 2023/0206234 A1* | 6/2023 | Coker | ................ G06Q 20/4097 |
| | | | 705/44 |

OTHER PUBLICATIONS

Khan et al., "Blockchain and 6G: The Future of Secure and Ubiquitous Communication," CoRR, Submitted on Jun. 10, 2021, arXiv:2106.05673, 7 pages.

Maksymyuk et al., "Blockchain-Based Intelligent Network Management for 5G and Beyond," 2019 3rd International Conference on Advanced Information and Communications Technologies (AICT), Jul. 2019, 36-39.

Xu et al., "Blockchain-Enabled Resource Management and Sharing for 6G Communications," Digital Communications and Networks, Aug. 2020, 6(3):261-269.

* cited by examiner

500

500

650

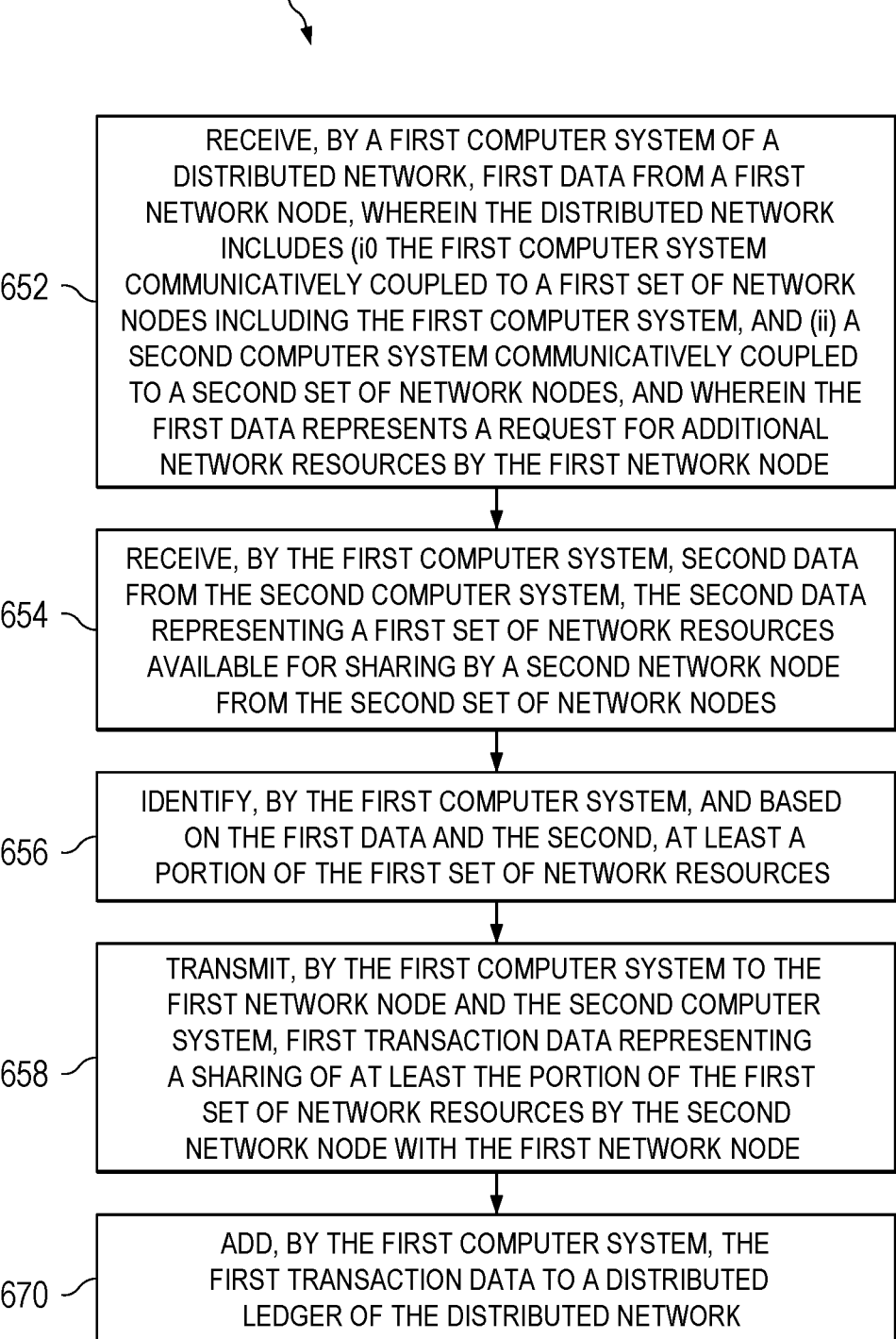

652 — RECEIVE, BY A FIRST COMPUTER SYSTEM OF A DISTRIBUTED NETWORK, FIRST DATA FROM A FIRST NETWORK NODE, WHEREIN THE DISTRIBUTED NETWORK INCLUDES (i0 THE FIRST COMPUTER SYSTEM COMMUNICATIVELY COUPLED TO A FIRST SET OF NETWORK NODES INCLUDING THE FIRST COMPUTER SYSTEM, AND (ii) A SECOND COMPUTER SYSTEM COMMUNICATIVELY COUPLED TO A SECOND SET OF NETWORK NODES, AND WHEREIN THE FIRST DATA REPRESENTS A REQUEST FOR ADDITIONAL NETWORK RESOURCES BY THE FIRST NETWORK NODE

654 — RECEIVE, BY THE FIRST COMPUTER SYSTEM, SECOND DATA FROM THE SECOND COMPUTER SYSTEM, THE SECOND DATA REPRESENTING A FIRST SET OF NETWORK RESOURCES AVAILABLE FOR SHARING BY A SECOND NETWORK NODE FROM THE SECOND SET OF NETWORK NODES

656 — IDENTIFY, BY THE FIRST COMPUTER SYSTEM, AND BASED ON THE FIRST DATA AND THE SECOND, AT LEAST A PORTION OF THE FIRST SET OF NETWORK RESOURCES

658 — TRANSMIT, BY THE FIRST COMPUTER SYSTEM TO THE FIRST NETWORK NODE AND THE SECOND COMPUTER SYSTEM, FIRST TRANSACTION DATA REPRESENTING A SHARING OF AT LEAST THE PORTION OF THE FIRST SET OF NETWORK RESOURCES BY THE SECOND NETWORK NODE WITH THE FIRST NETWORK NODE

670 — ADD, BY THE FIRST COMPUTER SYSTEM, THE FIRST TRANSACTION DATA TO A DISTRIBUTED LEDGER OF THE DISTRIBUTED NETWORK

FIG. 6C

DISTRIBUTED NETWORK MANAGEMENT SYSTEM

CROSS-REFERENCE TO RELATED APPLICATIONS

This application claims the benefit of priority to U.S. Application No. 63/359,976, filed on Jul. 11, 2022, the contents of which are hereby incorporated by reference.

TECHNICAL FIELD

This disclosure relates to managing networks, such as wireless networks, using a distributed network management system.

BACKGROUND

Wireless communication systems are rapidly growing in usage. Further, wireless communication technology has evolved from voice-only communications to also include the transmission of data, such as Internet and multimedia content, to a variety of devices.

SUMMARY

In an aspect, a system includes: a distributed network including a first computer system communicatively coupled to a first set of network nodes, and a second computer system communicatively coupled to a second set of network nodes. Each of the network nodes of the first and second sets of network nodes is associated with a respective set of network resources. The first computer system is configured to: receive first data from a first network node from the first set of network nodes, the first data representing a request for additional network resources by the first network node; receive second data from the second computer system, the second data representing a first set of network resources available for sharing by a second network node from the second set of network nodes; identify, based on the first data and the second, at least a portion of the first set of network resources; transmit, to the first network node and the second computer system, first transaction data representing a sharing of at least the portion of the first set of network resources by the second network node with the first network node; and add the first transaction data to a distributed ledger of the distributed network. The second computer system is configured to: transmit the second data to the first computer system, receive first data transaction data from the first computer system, and cause at least the portion of the first set of network resources to be shared by the second network node with the first network node Implementations of this aspect can include one or more of the following features.

In some implementations, the first set of network resources can include access to a first wireless network for transmitting and/or receiving data.

In some implementations, the first set of network resources can include access to a first frequency spectrum for transmitting and/or receiving data using a wireless network.

In some implementations, the distributed ledger can include a blockchain.

In some implementations, identifying at least the portion of the first set of network resources can include: receiving a set of rules for exchanging network resources between the first network node and the second network node, and identifying at least the portion of the first set of network resources based on the set of rules.

In some implementations, the set of rules can include one or more rules pertaining to a geographical location.

In some implementations, the set of rules can include one or more rules pertaining to at least one of a time of day or a date.

In some implementations, the set of rules can be retrieved from a third computer system of the distributed network.

In some implementations, at least the portion of the first set of network resources can be identified based on prediction data, the prediction data representing a predicted future demand for network resources by a first user device associated with the first network node.

In some implementations, the prediction data can be generated based on at least one of a predicted future location of the first user device or a predicted future availability of network resources.

In some implementations, the first computer system can be configured to: receive third data from the second computer system, the third data representing the first data representing a request for additional network resources by a third network node from the second set of network nodes; receive fourth data from a fourth network node from the first set of network nodes, the fourth data representing a second set of network resources available for sharing by the fourth network node; identify, based on the first data and the second, at least a portion of the second set of network resources; transmit, to the fourth network node and the second computer system, second transaction data representing a sharing of at least the portion of the second set of network resources by the fourth network node with the third network node; and add the second transaction data to the distributed ledger.

In some implementations, the second computer system can be configured to: transmit the third data to the first computer system, receive second data transaction data from the first computer system, and cause at least the portion of the second set of network resources to be shared by the fourth network node with the third network node.

In another aspect, a method includes: receiving, by a first computer system of a distributed network, first data from a first network node. The distributed network includes the first computer system communicatively coupled to a first set of network nodes including the first computer system, and a second computer system communicatively coupled to a second set of network nodes. The first data represents a request for additional network resources by the first network node. The method also includes receiving, by the first computer system, second data from the second computer system, the second data representing a first set of network resources available for sharing by a second network node from the second set of network nodes; identifying, by the first computer system, and based on the first data and the second, at least a portion of the first set of network resources; transmitting, by the first computer system to the first network node and the second computer system, first transaction data representing a sharing of at least the portion of the first set of network resources by the second network node with the first network node; and adding, by the first computer system, the first transaction data to a distributed ledger of the distributed network.

Implementations of this aspect can include one or more of the following features.

In some implementations, the first set of network resources can include access to a first wireless network for transmitting and/or receiving data.

In some implementations, the first set of network resources can include access to a first frequency spectrum for transmitting and/or receiving data using a wireless network.

In some implementations, the distributed ledger can include a blockchain.

In some implementations, identifying at least the portion of the first set of network resources can include: receiving a set of rules for exchanging network resources between the first network node and the second network node, and identifying at least the portion of the first set of network resources based on the set of rules.

In some implementations, the set of rules can include one or more rules pertaining to a geographical location.

In some implementations, the set of rules can include one or more rules pertaining to at least one of a time of day or a date.

In some implementations, the set of rules can be retrieved from a third computer system of the distributed network.

In some implementations, at least the portion of the first set of network resources can be identified based on prediction data, the prediction data representing a predicted future demand for network resources by a first user device associated with the first network node.

In some implementations, the prediction data can be generated based on at least one of a predicted future location of the first user device or a predicted future availability of network resources.

In some implementations, the method can also include: receiving third data from the second computer system, the third data presenting the first data representing a request for additional network resources by a third network node from the second set of network nodes; receiving fourth data from a fourth network node from the first set of network nodes, the fourth data representing a second set of network resources available for sharing by the fourth network node; identifying, based on the first data and the second, at least a portion of the second set of network resources; transmitting, to the fourth network node and the second computer system, second transaction data representing a sharing of at least the portion of the second set of network resources by the fourth network node with the third network node; and adding the second transaction data to the distributed ledger.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

BRIEF DESCRIPTION OF DRAWINGS

FIG. 6C is a diagram of another example process for managing a network using a blockchain-based distributed network management system.

DETAILED DESCRIPTION

Figure 1:
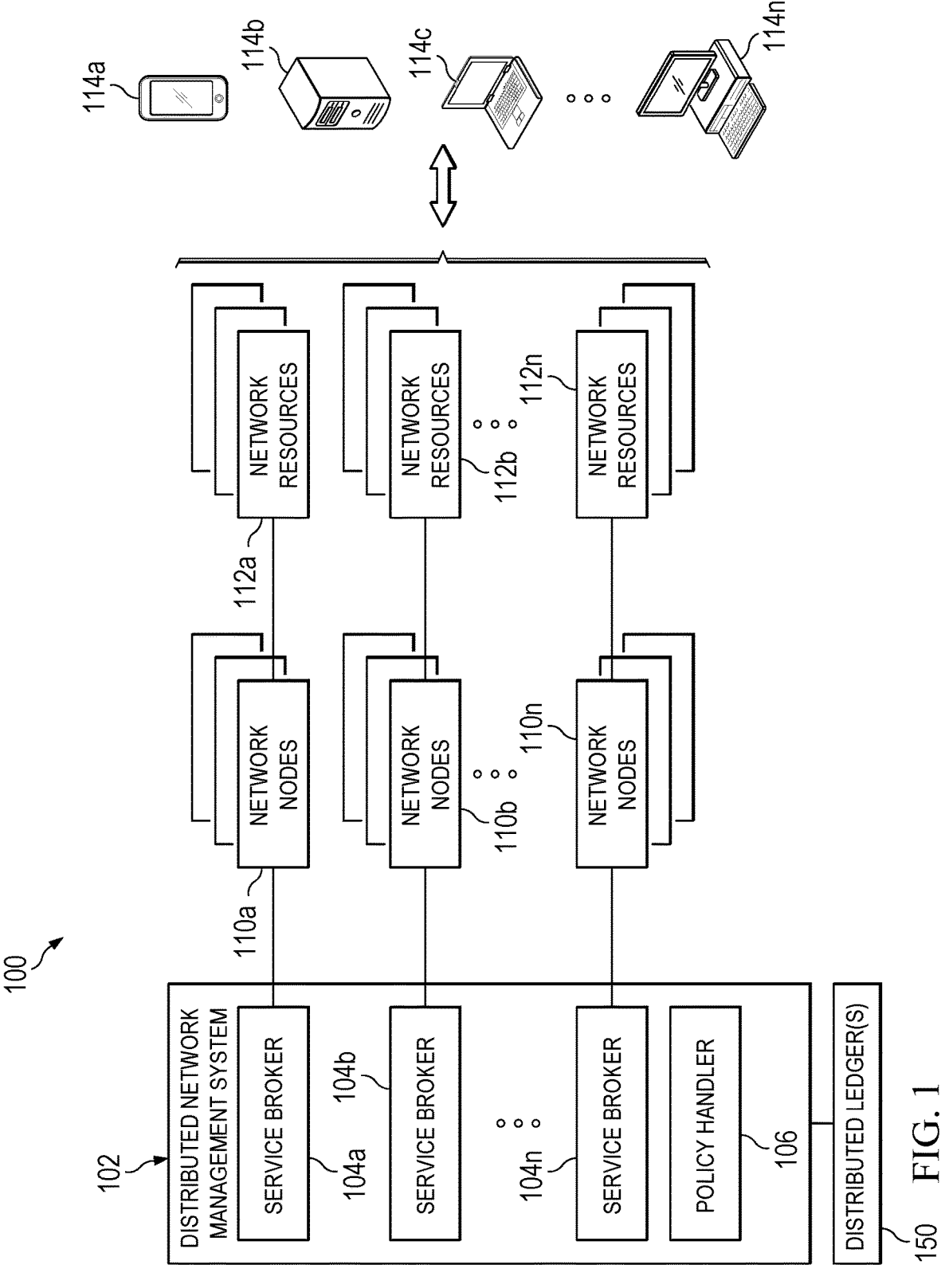
FIG. 1 is a diagram of an example system including a distributed network management system.

Example systems and techniques for managing networks (e.g., wireless networks) using a distributed network management system are described herein.

In some implementations, a distributed network management system can manage the exchange of network resources between second or more network nodes in a decentralized manner. As an example, a distributed network management system can include several service broker systems, each of which are communicatively coupled to one or more network nodes. Each service broker system can receive information from one or more of the network nodes regarding network resources of those network nodes that are available for sharing with other network nodes. Further, each service broker system can receive information from one or more of the network nodes regarding requests for additional network resources by those network nodes. Based on the received information, the service broker system can determine an exchange of network resources between two or more of the network nodes, and record information regarding the exchange in a distributed ledger (e.g., a blockchain).

The implementations described herein can provide various technical benefits. For example, the distributed network management systems described herein can enable network nodes to dynamically adjust their capabilities in response to changes in the supply and/or the demand for network resources. As an example, using a distributed network management system, network nodes can dynamically increase their capabilities during times of increased demand by their users (e.g., by obtaining network resources from other network nodes via the distributed network management system). As another example, network nodes can dynamically transfer their capabilities to other network nodes during times of decreased demand by their users (e.g., by transferring network resources from other network nodes via the distributed network management system). Accordingly, each of the network nodes can operate in a more effective and efficient manner.

Further, the distributed network management systems described herein can facilitate the exchange of network resources between network nodes in a decentralized manner (e.g., without the need for a single controlling system or entity). Accordingly, network resources can be exchanged between network nodes, even despite disruptions in portions of the distributed network management system.

Further, the distributed network management systems described herein can facilitate the exchange of network resources between network nodes in a secure and transparent manner. As an example, a distributed network management system can record information on a distributed ledger, such that information regarding each of the network nodes, their associated network resources, and the exchange of network resources between them is stored in a transparent, traceable, and immutable manner. This enables the distributed network management system to keep accurate and reliable records regarding each of the transactions conducted by the network nodes.

FIG. 1 shows an example system 100 of interconnected electronic devices. The system 100 includes a distributed network management system 102 implementing a distributed ledger 150. The system 100 also includes several network nodes 110a-110n, each associated with respective sets of network resources 112a-112n. Collectively, the network resources 112a-112n communicatively couple several client device 114a-114n to one another, such that the client device 114a-114n can transmit and/or receive data from one another (e.g., via one or more wireless networks).

In general, the distributed network management system 102 includes several service broker systems 104a-104n, each communicatively coupled to one or more of the network nodes 110a-110n. In some implementations, a single service broker system 104a-104n can be communicatively coupled to a single one of the network nodes 110a-110n. In some implementations, a single service broker system 104a-104n can be communicatively coupled to multiple ones of the network nodes 110a-110n concurrently.

A service broker system 104a-104n can be communicatively coupled to one or more of the other service broker system 104a-104n and/or to the network nodes 110a-110n using any communications network through which data can be transferred and shared. For example, a network can be a local area network (LAN) or a wide-area network (WAN), such as the Internet. Further, a network can be implemented using various networking interfaces, for instance wireless networking interfaces (such as Wi-Fi, Bluetooth, or infrared) or wired networking interfaces (such as Ethernet or serial connection). A network also can include combinations of more than one network, and can be implemented using one or more networking interfaces.

During operation of the system 100, the distributed network management system 102 facilitates the exchange of the network resources 112a-112n among the network nodes 110a-110n, and records information regarding the exchanges in the distributed ledger 150.

For example, each service broker system 104a-104n can receive information from one or more of the network nodes 110a-110n regarding network resources of those network nodes that are available for sharing with other network nodes. Further, each service broker system 104a-104n can receive information from one or more of the network nodes 110a-110n regarding requests for additional network resources by those network nodes. Based on the received information, the service broker systems 104a-104n can determine an exchange of network resources between two or more of the network nodes 110a-110n, and record information regarding the exchange in the distributed ledger 150.

In some implementations, a service broker system 104a-104n can receive information directly from one or more of the network nodes 110a-110n to which the service broker system 104a-104n is communicatively coupled. For example, each of the network nodes 110a-110n can generate information regarding the availability of and/or requests for network resources, and transmit the information to one or more of the services broker systems 104a-104n directly.

In some implementations, a service broker system 104a-104n can receive information indirectly from one or more of the network nodes 110a-110n (e.g., via another service broker system 104a-104n that is communicatively coupled to those network nodes). For example, each of the network nodes 110a-110n can generate information regarding the availability of and/or requests for network resources, and transmit the information to one or more of the services broker systems 104a-104n. Further, the service broker system 104a-104n can transmit at least a portion of the received information to other ones of the service broker systems 104a-104n.

In some implementations, a set of network resources 112a-112n can include a particular communications network (or portion thereof) that enables electronic devices and their users to transmit data to one another. For instance, each of the sets of network resources 112a-112n can include a different respective wireless network (or portion thereof). Example wireless networks include satellite communications networks, air-based wireless networks (e.g., wireless networks provided, at least in part, by airborne drones that transmit and/or receive wireless signals), terrestrial wireless network (e.g., wireless networks provided by ground-based systems that transmit and/or receive wireless signals, such as a ground-based cellular networks), water-based wireless networks (e.g., wireless networks provided, at least in part, by underwater systems that transmit and/or receive wireless signals), or any combinations thereof. As an example, referring to FIG. 1, the network node 110a can be associated with a first wireless network (e.g., the network resources 112a), the network node 110b can be associated with a second wireless network (e.g., the network resources 112b), and so forth.

In some implementations, at least some of the network can be publicly accessible networks (e.g., networks that can be publicly accessed by users or customers, such as those provided publicly by telecommunications carriers). In some implementations, at least some of the network can be private networks (e.g., networks that are restricted to particular users of an organization, such as internal enterprise network).

In some implementations, a set of network resources 112a-112n can include a particular wireless spectrum (or portion thereof) that enables electronic devices and their users to transmit data to one another wirelessly. For instance, each of the sets of network resources 112a-112n can include one or more particular frequency bands or frequency ranges for transmitting signals wirelessly. As an example, referring to FIG. 1, the network node 110a can be associated with one or more first frequency bands (e.g., the network resources 112a), the network node 110b can be associated with one or more second frequency bands (e.g., the network resources 112b), and so forth.

In some implementations, a set of network resources 112a-112n can include computational resources that enable electronic devices to process and store data that is transmitted and/or received using a network. As an example, each of the sets of network resources 112a-112n can include data processing capabilities provided by computer processors, such as central processing units (CPUs), graphics processing units (GPUs), application-specific integrated circuits (ASICs), arithmetic-logic units (ALUs), field-programmable gate arrays (FPGAs), any other computer processors, or any combinations thereof. As another example, each of the sets of network resources 112a-112n can include data storage capabilities provided by computer storage devices, such as random access memory (RAM), read only memory (ROM), hard disk drives, solid state drives, optical disc drives, flash memory, any other computer storage devices, or any combinations thereof. As an example, referring to FIG. 1, the network node 110a can be associated with a first set of computational and/or storage resources (e.g., the network resources 112a), the network node 110b can be associated with a second set of computational and/or storage resources (e.g., the network resources 112b), and so forth.

As described above, during operation of the system 100, the distributed network management system 102 facilitates the exchange of the network resources 112a-112n among the network nodes 110a-110n, and records information regarding the exchanges in the distributed ledger 150. Further, in some implementations, the distributed network management system 102 enables network nodes 110a-110n to exchange network resources 112a-112n with one another, without requiring that the network nodes 110a-110n communicate directly with one another. This may be beneficial, for example, as network nodes 110a-110n may be implemented independently from one another (e.g., implemented by different respective entities or organizations that do not coordinate with one another), and be otherwise unable to coordinating communications with one another directly.

Figure 2:
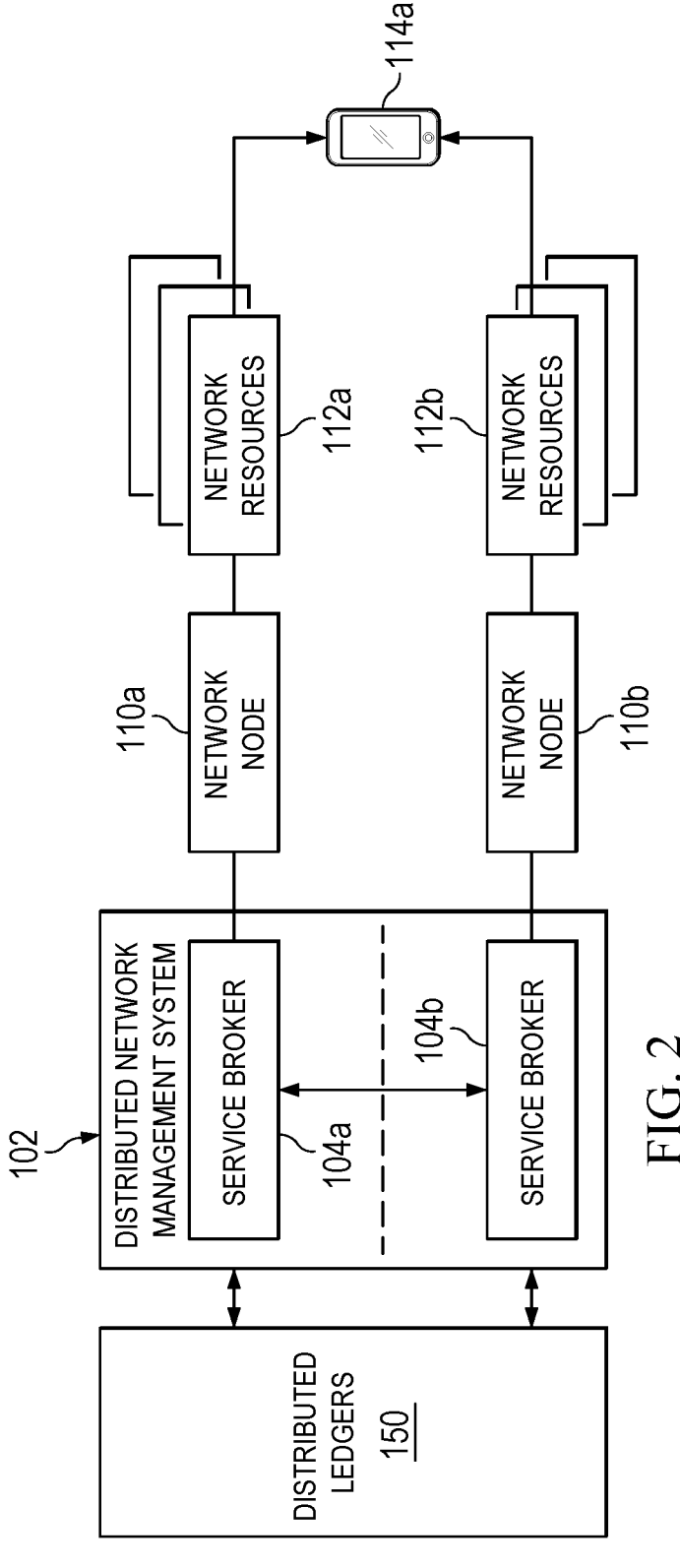
FIG. 2 is as diagram of an example operation of a distributed network management system.

As an illustrative example, FIG. 2 shows an exchange of network resources 112a and 112b between two network nodes 110a and 110a, via two service broker systems 104a and 1104b of the distributed network management system 102.

In the example shown in FIG. 2, the network node 110a provides the network resources 112a to a client device 114a (e.g., a mobile device, such as a smart phone) to enable the client device 114a to communicate wirelessly with one or more other client devices. As an example, the network node 110a can provide the client device 114a with access to one or more particular wireless networks, wireless spectra, sets of computational resources, sets of data storage resources, or any combination thereof.

Further, the network node 110a determines that additional network resources may be needed to provide network service to the client device 114a (and each of the other client devices that are utilizing at least a portion of the network resources 112a). Based on this determination, the network node 110a transmits a request to the service broker system 104a for additional resources. In some implementations, the request can indicate the type of network resources that are being requested (e.g., a request for access to one or more additional wireless networks, wireless spectra, sets of computational resources, sets of data storage resources, etc.). Further, the request can indicate the specific geographical location(s) at which the network resources are requested, and/or the specific time(s) during which use of the network resources are requested.

In some implementations, the network node 110a can determine that additional network resources may be needed based on an insufficiency of network coverage of its existing network resources 112a. For example, if the client device 114a is positioned at a geographical location that is not adequately covered by the existing network resources 112a, the network node 110a may determine that additional network resources may be need to improve network coverage.

In some implementations, the network node 110a can determine that additional network resources may be needed based on performance metrics associated with its existing network resources 112a. For example, if the performance metrics of the existing network resources 112a are poor (e.g., below a threshold metric), the network node 110a may determine that additional network resources may be need to improve network performance. In some implementations, performance metrics can represent an available bandwidth of a network, the latency of the network, a data throughput of the network, a reliability of the network, a congestion of the network, and/or any other characteristic of the network.

Further, the network node 110b determines an availability of network resources 112b for sharing with other network nodes. As an example, the network node 110b can determine that that the capacity one or more particular wireless networks, wireless spectra, sets of computational resources, sets of data storage resources, or any combination thereof exceeds the demand of those network resources. Based on this determination, the network node 110b transmits information regarding the availability of the network resources 112b to the service broker system 104b. In some implementations, the information can indicate the specific type of network resources that are available, the specific geographical location(s) at which the network resources are available, and/or the specific time(s) during which the network resources are available.

The service broker system 104a transmits information regarding the request for additional network resources by the network node 110a to each of the other service broker systems 104a-104n of the distributed network management system 102. Further, the service broker system 104b transmits information regarding the availability of network resources 112b of the network node 110b to each of the other service broker systems 104a-104n of the distributed network management system 102.

Based on the transmitted information, the service broker systems 104a and 104b determine that at least a portion of the network resources 112b would at least partially fulfill the request by the network node 110a. Further, the service broker systems 104a and 104b facilitate the transfer of at least a portion of the network resources 112b to the network node 110a, and stores a record of the transfer in the distributed ledger 150. For example, the service broker system 104b can instruct the network node 110b to transfer at least a portion of the network resources 112b (e.g., such that the client device can use both the network resources 112a and at least a portion of the network resources 112b to communicate with other client devices). Further, the service broker system 104a can notify the network node 110a that at least a portion of the network resources 112b is being transferred from the network node 110b to the network node 110a.

In some implementations, a single service broker system can determine that an exchange of network resources should be performed. As an example, referring to FIG. 2, the service broker system 104a can receive a request from the network node 110a directly, and receive information regarding the availability of network resources 112b of the network node 110b indirectly via the service broker system 104b. Further, based on the received information, the service broker system 104a can determine that at least a portion of the network resources 112b would at least partially fulfill the request by the network node 110a. In response, the service broker system 104a can facilitate the transfer of at least a portion of the network resources 112b to the network node 110a. For instance, the service broker system 104a can notify the service broker system 104b to instruct the network node 110b to transfer at least a portion of the network resources 112b. Further, the service broker system 104a can notify the network node 110a that at least a portion of the network resources 112b is being transferred from the network node 110b to the network node 110a.

As another example, referring to FIG. 2, the service broker system 104b can receive a request from the network node 110a indirectly via the service broker system 104a, and receive information regarding the availability of network resources 112b directly from the network node 110b. Further, based on the received information, the service broker system 104b can determine that at least a portion of the network resources 112b would at least partially fulfill the request by the network node 110a. In response, the service broker system 104*b* can facilitate the transfer of at least a portion of the network resources 112*b* to the network node 110*a*. For instance, the service broker system 104*b* can instruct the network node 110*b* to transfer at least a portion of the network resources 112*b*. Further, the service broker system 104*b* can instruct the service broker system 104*a* to notify the network node 110*a* that at least a portion of the network resources 112*b* is being transferred from the network node 110*b* to the network node 110*a*.

In some implementations, multiple service broker systems can determine that an exchange of network resources should be performed. For example, referring to FIG. 2, each of the service broker systems 104*a* and 104*b* can receive the request from the network node 110*a* (either directly or indirectly via another service broker system), and receive information regarding the availability of network resources 112*b* (either directly or indirectly via another service broker system). Further, based on the received information, each of the service broker systems 104*a* and 104*b* can determine that at least a portion of the network resources 112*b* would at least partially fulfill the request by the network node 110*a*, and notify the other service broker systems regarding the determination. If the service brokers system 104*a* and 104*b* concur with one another, the service broker systems 104*a* and 104*b* can facilitate the transfer of at least a portion of the network resources 112*b* to the network node 110*a*. For instance, the service broker system 104*b* can instruct the network node 110*b* to transfer at least a portion of the network resources 112*b*. Further, the service broker system 104*a* can notify the network node 110*a* that at least a portion of the network resources 112*b* is being transferred from the network node 110*b* to the network node 110*a*.

In some implementations, one or more of the service broker systems 104*a*-104*n* can determine that an exchange of network resources should be performed based on information received from a policy handler system 106. For instance, the policy handler system 106 can maintain one or more rules that regulate the exchange of network resources between the network nodes 110*a*-110*n*. As an example, at least some of the rules can specify circumstances in which an exchange of network resources can be performed (and any limitations to the exchange). As another example, at least some of the rules can specify circumstances in which an exchange of network resources is prohibited.

In general, the rules can pertain to any aspect of the network nodes 110*a*-110*n*, the network resources 112*a*-112*n*, and the circumstances in which the network resources 112*a*-112*n* might be exchanged between the network nodes 110*a*-110*n*.

An example, at least some of the rules can specify one or more types of network resources (e.g., access to particular wireless networks, wireless spectra, computational resources, storage resources, etc.) that can be exchanged or are prohibited from being exchanged.

As another example, at least some of the rules can specify one or more times of day, days of the week, dates, etc. for which an exchange of network resources can be performed or is prohibited from being performed.

As another example, at least some of the rules can specify one or more geographical locations for which an exchange of network resources can be performed or is prohibited from being performed.

As another example, at least some of the rules can specify one or more network nodes 110*a*-110*n* that are permitted to exchange network resources or are prohibited from exchanging network resources.

Although example criteria are described herein, these are merely illustrative examples. In practice, rules can be pertain to any other criteria, either instead of or in additional to those described herein.

In some implementations, at least some of the rules can pertain to single criterion (e.g., type of network resource, time, geographical location, network node, or any other criterion).

In some implementations, at least some of the rules can pertain to multiple criteria (e.g., a combination of a type of network resource, time, geographical location, network node, and/or any other criteria).

In some implementations, the policy handler system 106 can be implemented as a system that is separate and distinct from each of the service broker systems 104*a*-104*n*. Further, the policy handler system 106 can transmit information (e.g., sets of rules) to one or more of the service broker systems 104*a*-104*n* via a communications network, such as a LAN, WAN, the Internet, etc. In some implementations, the policy handler system 106 can be implemented as a component of one or more of the service broker systems 104*a*-104*n*.

In general, the distributed network management system 102 can record any information pertaining to the exchange of network resources on the distributed ledger 150.

As an example, the distributed ledger 150 can store information regarding the availability of network resources by one or more of the network nodes 110*a*-110*n*. For example, the distributed ledger 150 can store information indicating the specific types of network resources that are available, the specific network nodes 110*a*-110*n* that are associated with the network resources, the specific geographical location(s) at which the network resources are available, and/or the specific time(s) during which the network resources are available.

As another example, the distributed ledger 150 can store information regarding requests for network resources by one or more of the network nodes 110*a*-110*n*. For example, the distributed ledger 150 can store information indicating the specific types of network resources that are requested, the specific network nodes 110*a*-110*n* that are associated with the requests, the specific geographical location(s) at which the network resources are requested, and/or the specific time(s) during which use of the network resources are requested.

As another example, the distributed ledger 150 can store information regarding the exchange of network resources between two or more of the network nodes 110*a*-110*n*. For example, the distributed ledger 150 can store information indicating the specific types of network resources that were exchanged, the specific network nodes 110*a*-110*n* that are associated with the exchange, the specific geographical location(s) at which the network resources were exchanged, and/or the specific time(s) during which the exchange occurred (e.g., the time at which the network resource was transferred from one network node to another, the time at which the network resource reverted back to the original network node, etc.). As another example, the distributed ledger 150 can store information regarding remuneration provided by one entity to another in connection with the exchange (e.g., a payment by a first entity requesting use of a set of network resources to a second entity that controls that set of network resources).

In some implementations, the distributed ledger 150 can store information in the form of "smart contracts." For example, the distributed ledger 150 can store information regarding a request for network resources by a network node, and proposed terms and conditions associated with the request (e.g., the network resources that are being requested, the geographical location(s) and/or time(s) associated with the request, a proposed remuneration for the exchange, etc.). Further, the terms and conditions can be expressed programmatically, such that the exchange of network resources (and any corresponding remuneration) can be executed automatically upon acceptance by the appropriate parties to the exchange and the satisfaction of the specified terms and conditions.

In some implementations, the distributed ledger 150 can store information in several blocks (e.g., several data records or other logical units of data). For example, at least some of the blocks of the distributed ledger 150 can include information regarding particular network node(s) 110a-110n and/or network resource(s) 112a-112n. As another example, at least some of the blocks of the distributed ledger 150 can include information regarding requests by the network node(s) 110a-110n for additional network resource(s). As another example, at least some of the blocks of the distributed ledger 150 can include information regarding the availability of network resources of the network node(s) 110a-110n. As another example, at least some of the blocks of the distributed ledger 150 can include information regarding the exchange of network resources between two or more of the network node(s) 110a-110n.

Further, the blocks can be sequentially arranged in a chain (e.g., a "blockchain"). For example, the blocks can be arranged in a chain in order of time, where the first block in the chain corresponds to the first transaction (or group of transactions) in time, and the last block in the chain corresponds to the most recently transaction (or group of transactions) in time.

Further, the blocks can be cryptographically signed, such that the blocks cannot be tampered with after they have been added to the distributed ledger 150. For instance, each block in a chain can be cryptographically signed based on one or more previous blocks in the chain. As an example, a first block can be cryptographically signed by inputting at least the following into a hashing function: (i) a hash value representing the first block, and (ii) a hash value representing the immediately prior block in the chain. The output of the hashing function can be used as the cryptographic signature for the first block in the chain. If the prior block in the chain is subsequently modified, the modification would result in a different hash value for that block. Accordingly, the cryptographic signature of the first block (and the cryptographic signature of all blocks subsequent to the first block in the chain) would no longer be valid. Thus, if a block is tampered with after it has been added to the chain, the tampering can be readily detected and invalidated based on the inconsistencies of the cryptographic signatures of the blocks in the chain.

In some implementations, each of the service broker systems 104a-104n and/or the network nodes 110a-110n can maintain a respective instance of the distributed ledger 150 (e.g., a copy of the distributed ledger 150). Further, each of the service broker systems 104a-104n and/or the network nodes 110a-110n can periodically or continuously modify the distributed ledger 150 over time. For example, each of the service broker systems 104a-104n and/or the network nodes 110a-110n can add additional cryptographically signed blocks to the chain, such as to record new information regarding the network nodes 110a-110n, network resources 112a-112n, requests for network resources, and/or exchanges of network resources.

In some implementations, a subset of the service broker systems 104a-104n and/or the network nodes 110a-110n can maintain a respective instance of the distributed ledger 150. Further, a subset of the service broker systems 104a-104n and/or the network nodes 110a-110n can periodically or continuously modify the distributed ledger 150 over time (e.g., by adding additional cryptographically signed blocks to the chain).

In some implementations, the system 100 can determine a consensus regarding the contents of the distributed ledger 150 based on input provided by the service broker systems 104a-104n and/or the network nodes 110a-110n. For example, the system 100 can determine a consensus using one or more consensus protocols, such as proof of work (e.g., a form of cryptographic proof in which one entity proves to others that a certain amount of a specific computational effort has been expended), proof of stake (e.g., a form of proof in which validators of information are selected in proportion to their quantity of holdings in the associated cryptocurrency), etc.

In general, each of the components of the system 100 (e.g., the distributed network management system 102 including the service broker systems 104a-104n, policy handler system 106, network nodes 110a-110n, client devices 114a-114n, etc.) can include any number of computer devices that are configured to receive, process, and transmit data. Example computer devices include client computing devices (e.g., desktop computers or notebook computers), server computing devices (e.g., server computers or cloud computing systems), mobile computing devices (e.g., cellular phones, smartphones, tablets, personal data assistants, notebook computers with networking capability), wearable computing devices (e.g., smart phones or headsets), and other computing devices capable of receiving, processing, and transmitting data. In some implementations, the computer devices can operate using one or more operating systems (e.g., Microsoft Windows, Apple macOS, Linux, Unix, Google Android, and Apple iOS, among others) and one or more architectures (e.g., x86, PowerPC, and ARM, among others). In some implementations, one or more of the computer devices need not be located locally with respect to the rest of the system 100, and one or more of the computer devices can be located in one or more remote physical locations.

Each of the computer devices can include a respective user interface that enables users interact with that computer device and/or other computer devices. For example, a user interface can enable a user to view data from one or more of the computer devices. As another example, a user interface can enable a user to transmit data from one computer device to another. As another example, a user interface can enable a user to issue commands to one or more of the computer devices. Commands can include, for example, any user instruction to one or more of the computer devices to perform particular operations or tasks. In some implementations, a user can install a software application onto one or more of the computer devices to facilitate performance of these tasks.

In FIG. 1, each of the service broker system 104a-104n, policy handler system 106, and network nodes 110a-110n are illustrated as respective single components. However, in practice, the service broker system 104a-104n, the policy handler system 106, and/or network nodes 110a-110n can be implemented on one or more respective computing devices (e.g., each computing device including at least one processor such as a microprocessor or microcontroller).

Figure 3:
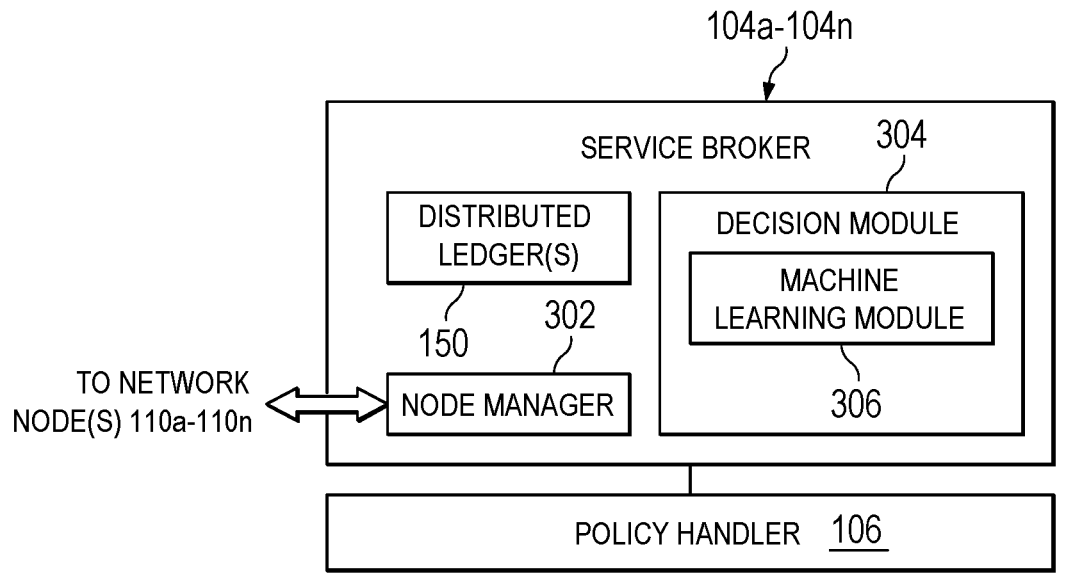
FIG. 3 is a diagram of an example service broker system of a distributed network management system.

An example service broker system 104a-104n is shown in greater detail in FIG. 3.

As described above, a service broker system 104a-104n can store copy of the distributed ledger 150 locally (e.g., using one or more computer storage devices).

Further, the service broker system 104a-104n includes a node manager 302 for managing the operation one or more of the network nodes 110a-110n. For instance, the node manager 302 can be configured to receive data from one or more of the network nodes 110a-110n (e.g., requests for additional network resources, information regarding available network resources, etc.).

Further, the node manager 302 can be configured to transmit data to one or more of the network nodes 110a-110n, either directly or indirectly via another service broker systems 104a-104n. As an example, the node manager 302 can transmit commands to one or more of the network nodes 110a-110n that instruct the network nodes 110a-110n to transfer a particular set of network resources to another network node. As another example, the node manager 302 can transmit notifications to one or more of the network nodes 110a-110n that notify the network nodes 110a-110n that a particular set of network resources are being transferred to that network node 110a-110n.

Further, the service broker system 104a-104n includes a decision module 304 for determining whether to exchange particular network resources 112a-112n between two or more of the network nodes 110a-110n. The decision module 304 can determine whether to exchange network resources based at least in part on (i) information obtained from the network nodes 110a-110n, and (ii) information provided by the policy handler system 106 (e.g., one or more rules, as described above).

In some implementations, the decision module 304 can determine whether to exchange network resources using a machine learning module 306. For example, the machine learning module 306 can be trained using training data (e.g., historical data regarding the system 100 and/or the client devices 114a-114f) to automatically identify correlations, patterns, or other trends in the training data that are indicative of certain desired decisions or outcomes (e.g., a decision whether to transfer network resources between network nodes). Upon completion of the training process, the machine learning module 306 can be used to process a respective portion of input data (e.g., input data describing the current state of the system 100 and/or the client devices 114a-144f) to determine a corresponding decision or outcome (e.g., a decision whether to transfer network resources between network nodes).

In some implementations, the machine learning module 306 can be trained using a supervised learning process. For example, machine learning module 306 can be trained using labeled training data including sets of training examples. Each of the training examples can indicate a particular feature set (e.g., conditions of the system 100), and a particular desired output in response to the feature set. Using this training data, the machine learning module 306 can be trained to infer correlations between certain characteristics of the feature set and a particular desired result, and determine functions or mathematical relationships to express this correlation.

In some implementations, the machine learning module 306 can be trained using an unsupervised learning process. For example, the machine learning module 306 can be trained using unlabeled training data (e.g., training data that includes example input data, without any annotations or tags indicating the characteristics, properties, or classifications of that data). The machine learning module 306 can automatically identify correlations, patterns, or other trends in the training data that can be used to determine similarities and/or differences in the training data, identify one or more dimensions in the example input data corresponding to identified trends, and determine functions or mathematical relationships to express the characteristics of the training data according to the identified dimensions.

Figure 4:
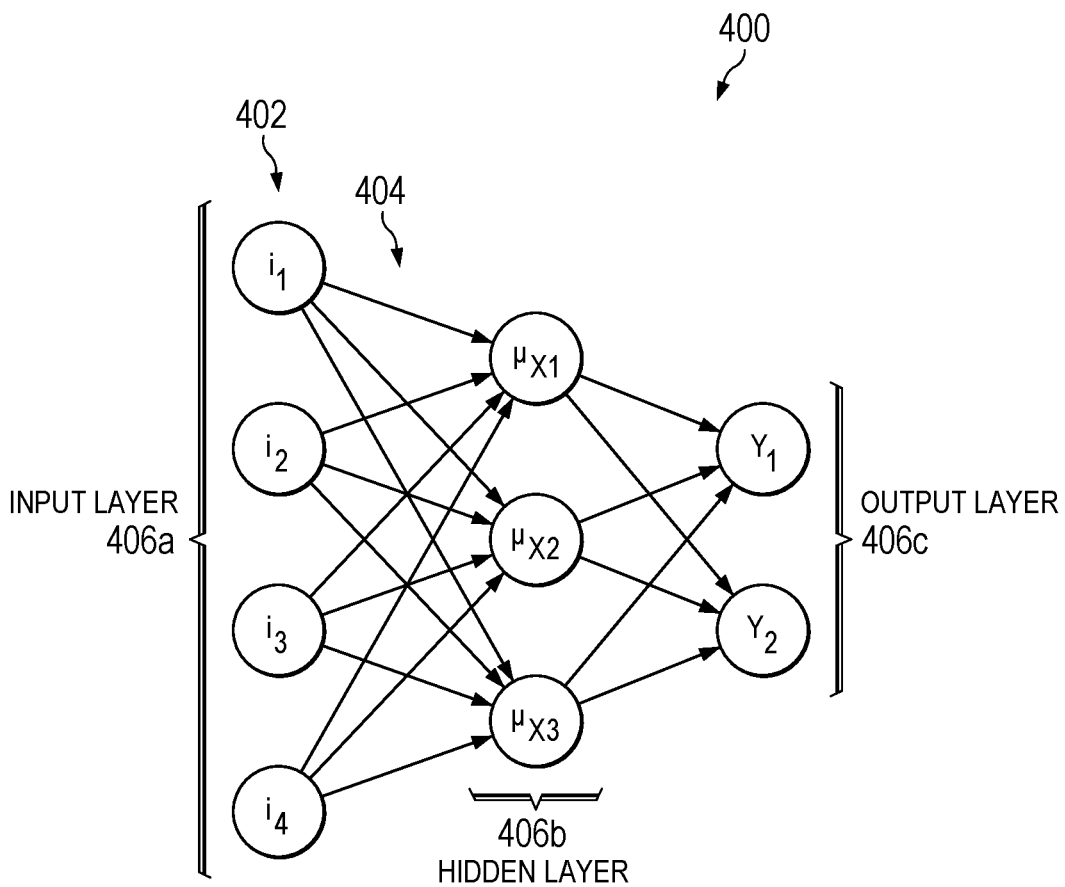
FIG. 4 is a diagram of an example neural network.

In some implementations, the machine learning module 306 can include one or more neural networks. A simplified example of a neural network 400 is shown in FIG. 4.

The neural network 400 includes several nodes 202 (often called "neurons") interconnected with another by interconnections 404. Further, the nodes 402 are arranged according to multiple layers, including an input layer 406a, a hidden layer 406b, and an output layer 406c. The arrangement of the nodes 402 and the interconnections 404 between them represent a mathematical transformation of input data (e.g., as received by the nodes of the input layer 406a) into corresponding output data (e.g., as output by the nodes of the output layer 406c).

In some implementations, the input data can represent one or more portions of information received from the network nodes 110a-110n. For example, the input data can represent the state of the network nodes 110a-110n and/or their respective network resources 112a-112n, such as the availability of particular network resources 112a-112n for sharing with other network nodes, the performance of the network nodes 110-110n and their respective network resources 112a-112n, etc. As another example, the input data can represent one or more requests by the network nodes 110a-110n for additional network resources. As another example, the input data can represent the state of one or more of the client devices 114a-114n (e.g., patterns of usage, geographical locations, times of usage, etc.)

Further, the output data can represent one or more corresponding feature sets generated by the neural network 400 based on the input data (e.g., to implement the functionality described with respect to the decision module 304 and/or machine learning module 306). In some implementations, the output data can represent one or more decisions or outcomes that may be made based on the input data (e.g., decision whether to transfer network resources between network nodes).

The nodes 402 of the input layer 406a receive input values and output the received input values to respective nodes of the next layer of the neural network 400. In this example, the neural network 400 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (e.g., as indicated by the interconnections 404).

The nodes of the hidden layer 406b receive input values (e.g., from the nodes of the input layer 406a or nodes of other hidden layers), applies particular transformations to the received values, and outputs the transformed values to respective nodes of the next layer of the neural network 400 (e.g., as indicated by the interconnections 404). In this example, the neural network 400 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 406b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n} (\text{weight}_i * \text{input}_i) + \text{bias},$$

where $\text{weight}_i$ is the weight that is applied to an input $\text{input}_i$, bias is a bias or offset value is that is applied to the sum of the weighted inputs, and Y is the output of the node.

The nodes of the output layer 406c receive input values (e.g., from the nodes of the hidden layer 406b) and output the received values. In some implementations, nodes of the output layer 406c can also receive one or more input values, and transform the one or more received values according to a mathematical transfer function (e.g., in a similar manner as the nodes of the hidden layer 406b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In this example, the neural network 400 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 400.

Although FIG. 4 shows example nodes and example interconnections between them, this is merely an illustrative example. In practice, a neural network can include any number of nodes that are interconnected according to any arrangement. Further, although FIG. 4 shows a neural network 400 having a single hidden layer 406b, in practice, a network can include any number of hidden layers (e.g., one, two, three, four, or more), or none at all.

Further, in some implementations, the machine learning module 306 can include one or more types of neural networks. Example types of neural networks include feedforward networks, regulatory feedback networks, radial bias function networks, recurrent neural networks, modular neural networks, transformer neural networks, or any other type of neural network.

In some implementations, the decision module 304 can predict that a network node will request access to additional network resources, prior to the network node actually making that request. Further, the decision module 304 can identify suitable network resources to at least partially fulfill the predicted request, and preemptively facilitate the exchange of network resources to the network node. This can be beneficial, for example, in eliminating (or otherwise reducing) delays in providing additional network resources to a network node. Accordingly, the network node is less likely to experience a degradation or disruption in service to its users.

As an example, the decision module 304 can predict (e.g., using the machine learning module 306 and/or the neural network 400) that a network node will experience an increase in demand for a certain type of network resource at a certain geographical location at a certain time. Based on this prediction, the decision module 304 can identify additional network resources (e.g., network resources that are made available by other network nodes) that can be transferred to the network node to meet the demand. In some implementations, a server broker system 104a-104n can preemptively initiate the exchange of network resources, prior to the network node actually making a request for additional network resources. In some implementations, a server broker system 104a-104n can refrain from initiating the exchange of network resources until the network node actually makes a request for additional network resources.

As another example, the decision module 304 can predict (e.g., using the machine learning module 306 and/or the neural network 400) that a network node will experience a decrease in demand for a certain type of network resource at a certain geographical location at a certain time, such that there will be an excess of the network resource at that geographical location and time. Based on this prediction, the decision module 304 can determine whether the excess network resources can be transferred to other network nodes (e.g., on a temporary basis) to meet a demand for network resources experienced by the other network nodes. In some implementations, a server broker system 104a-104n can preemptively initiate the exchange of network resources, prior to the other network node actually making a request for additional network resources. In some implementations, a server broker system 104a-104n can refrain from initiating the exchange of network resources until the other network node actually makes a request for additional network resources.

In some implementations, the decision module 304 can predict that a network node will request access to additional network resources based on a behavior of one or more of the client devices 114a-114n. For instance, the decision module 304 can predict that a particular client device 114a-114n will (i) be located at a particular geographical location and time, (ii) use particular types of network resources at that geographical location and time, and (iii) utilize the network resources to a particular degree (e.g., expressed as a utilization metric, such as the network bandwidth used, the throughput of the data transfer, the volume of the data transfer, etc.). Based on this prediction, the decision module 304 can identify whether network resources can be exchanged between the network nodes 110a-110n to meet the predicted usage of the client device 114a-114n. In some implementations, a server broker system 104a-104n can preemptively initiate the exchange of network resources, prior to a network node actually making a request for additional network resources. In some implementations, a server broker system 104a-104n can refrain from initiating the exchange of network resources until a network node actually makes a request for additional network resources.

As an illustrative example, the decision module 304 can predict (e.g., using the machine learning module 306 and/or the neural network 400) that a client device 114a-114n will traverse a particular path during a particular time interval in the future, and will attempt to perform operations requiring a particular level of network capability that that time (e.g., transfer a particular amount of data according to a particular throughput, latency, etc.). Based on this prediction, the decision module 304 can identify a set of network resources that can be used to provide service to the client device 114a-114n. For instance, the decision module 304 can identify a first set of network resources to provide service to the client device 114a-114n on a first leg of its travel (e.g., a first wireless network, a first wireless spectrum, etc.), a second set of network resources to provide service to the client device 114a-114n on a second leg of its travel (e.g., a second wireless network, a second wireless spectrum, etc.), and so forth. Further, a server broker system 104a-104n can preemptively initiate the exchange of network resources, such that the network resources are available for use of by client device 114a-114n at the predicted locations and times.

Further, in some implementations, the decision module 304 can assign different sets of network resources to different respective users.

In some implementations, the decision module 304 can assign different sets of network resources to different respective users using on a priority-based approach. For instance, users can be classified into several priority classes. Further, a decision module 304 can prioritize the assignment of network resources based on the priority classes of the users. For instance, the highest priority users can be assigned network resources first. Any network resources that remain can be assigned to the next highest priority users, and so forth, until all users have been assigned network resources or no network resources remain.

Figure 5A:
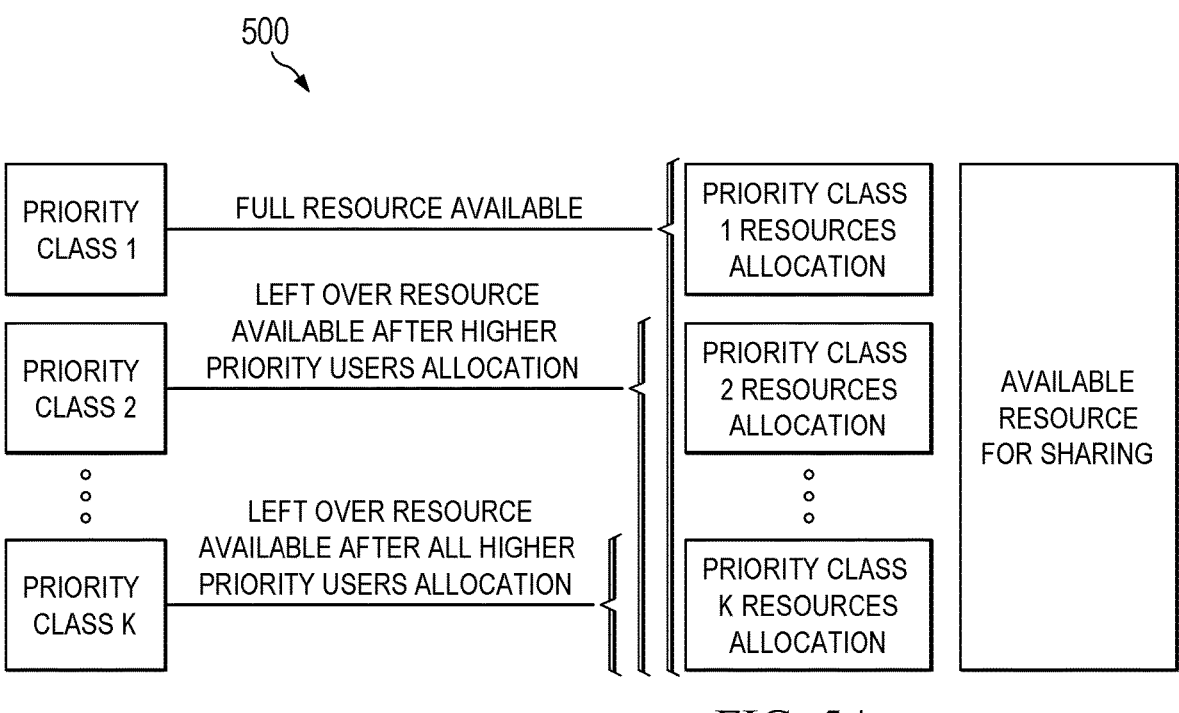
FIG. 5A is a diagram showing a priority-based approach for sharing network resources among users.

As an example, referring to FIG. 5A, users can be classified into several priority classes (e.g., "Priority Class 1" to "Priority Class K"). Further, a set of network resources 500 can be made available to the users. The decision module 304 can assign network resources to the users in the highest priority class (e.g., "Priority Class 1") first. The remaining resources can be assigned to the next highest priority class (e.g., "Priority Class 2"), and so forth, until the lowest priority users (e.g., "Priority Class K") have been assigned network resources or no network resources remain.

In some implementations, the decision module 304 can make sets of network resources to users using on a rules-based approach. For instance, one or more rules can specify that a particular type of network resource can be made available for use by other users under certain circumstances or conditions. As an example, one or more rules can be specify that, for a network resource that is provided by a particular user (or group of users), the network resource can be shared with other particular users if the utilization of the network resource by that user (or group of users) is less than a particular threshold level. Otherwise, the user (or group of users) retains exclusive use of that network resource.

For instance, one or more rules can be specify sharing conditions for computational resources that are provided by a particular user (e.g., a personal server system of the user). If the utilization of computational resource by the user is less than a particular threshold level, the one or more rules can specify that the computation resources by shared with one or more other users. Otherwise, the user retains exclusive use of those computation resources.

Figure 5B:
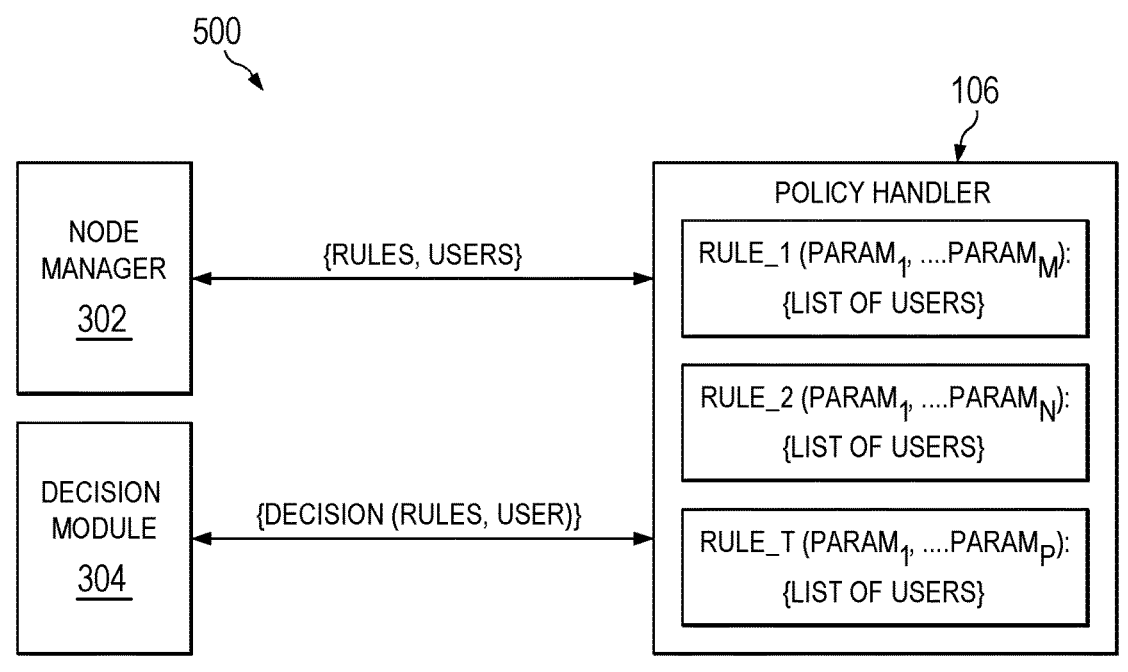
FIG. 5B is a diagram showing a rules-based approach for sharing network resources among users.

Referring to FIG. 5B, in some implementations, one or more of the rules can be obtained by the node manager 302 (e.g., from one or more of the network nodes), and provided to the policy handler system 106 for storage. Further, the policy handler 106 can provide one or more of the rules to the decision module 304, which generates a decision regarding whether to share particular network resources between particular users (e.g., based on the satisfaction or one or more of the rules).

Example Processes

Figure 6A:
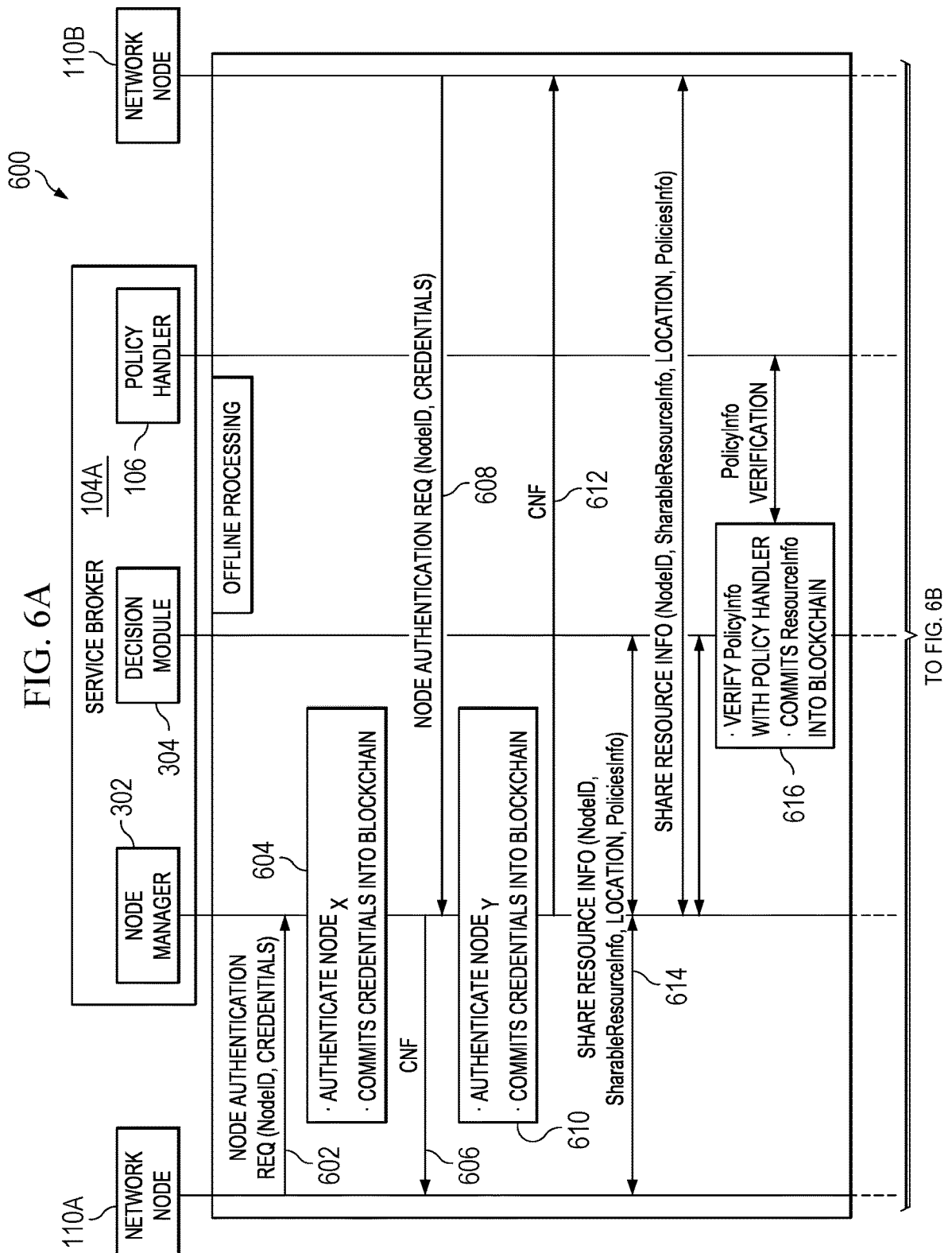
FIGS. 6A and 6B are a diagram of an example process for managing a network using a distributed network management system.
Figure 6B:
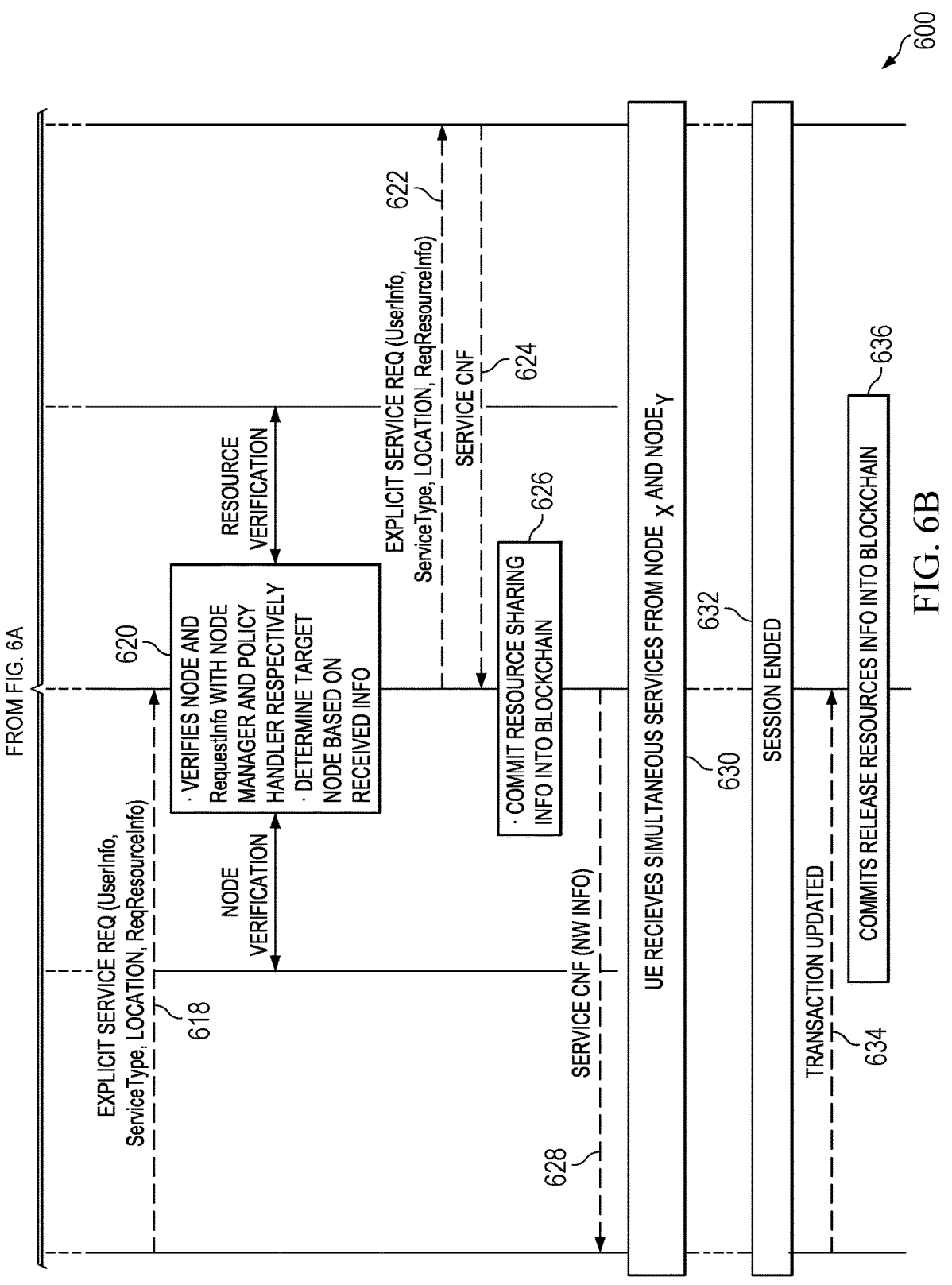

FIGS. 6A and 6B show an example process 600 for managing a network using a distributed network management system. In some implementations, the process 600 can be performed by the system 100 described herein using one or more processors (e.g., using the processor or processors 710a-710n shown in FIG. 7).

In the process 600, a first network node 110a authenticates itself to the node manager 302 of a service broker system 104a (block 602). As an example, the first network node 110a can transmit, to the node manager 302, a node authentication request with an identifier of the first network node 110a and security credentials associated with the first network node 110a (e.g., security key, login information, etc.).

The node manager 302 authenticates the first network node 110a based on the provided information, and records the security credentials to a distributed ledger (block 604). Further, node manager 302 transmits a confirmation of the node authentication request (CNF) to the first network node 110a (block 606).

Further, a second network node 110b authenticates itself to the node manager 302 (block 608). As an example, the second network node 110b can transmit, to the node manager 302, a node authentication request with an identifier of the second network node 110b and security credentials associated with the second network node 110b (e.g., security key, login information, etc.).

The node manager 302 authenticates the second network node 110b based on the provided information, and records the security credentials to the distributed ledger (block 610). Further, node manager 302 transmits a CNF to the second network node 110b (block 612).

Further, the node manager 302 receives information from each of the network nodes 110a and 110b, and shares the information with each of the other network nodes 110a and 110b and the decision module 304 (block 614).

As an example, the node manager 302 can receive, from each of the network nodes 110a and 110b information regarding the network resources of that network nodes that are available for sharing with other network nodes (e.g., the type of network resources that are available, the geographical locations for those network resources, the times during which the network resources are available, etc.). Further, the node manager 302 can share the received information with each of the other network nodes 110a and 110b and the decision module 304.

As another example, the node manager 302 can receive, from the policy handler system 106, information regarding one or more rules regarding the sharing of network resources (block 616). Further, the node manager 302 can share the received information with each of the other network nodes 110a and 110b and the decision module 304 (block 614).

Further, the decision module 304 receives a request for additional network resources from the network node 110 (block 618). As an example, the request can identify the type of network resources that are requested, the geographical locations for those network resources, the times during which the network resources are requested, etc.

Further, the decision module 304 identifies network resources that are available to at least partially fulfill the request (block 620). For example, the decision module 304 can identify, based on information received from the network nodes 110a and 110b, node manager 302, and policy handler system 106, that a particular set of network resources can be transferred from the second network node 110b to the first network node 110a in accordance with the rules specified by the policy handler system 106. Further, the decision module 304 can verify with the node manager 302 that the network nodes 110*a* and 110*b* are authorized exchange network resources with one another.

Further, the decision module 304 transmits the request to the second network node 110*b* for fulfillment (block 620). For example, the decision module 304 can transmit the request with an indication of the type of network resources that are requested, the geographical locations for those network resources, the times during which the network resources are requested, etc.

The second network node 110*b* transmits a message to the decision module 304 indicating that the request has been accepted (e.g., by transmitting a service CNF) (block 624).

Upon receiving the message, the decision module 304 stores information regarding the exchange of network resources from the network node 110*b* to the network node 110*a* on the distributed ledger (block 626). Further, the decision module 304 transmits a message to the first network node 110*a* indicating that the request has been accepted by the second network node 110*b* (e.g., by transmitting a service CNF) (block 628).

Further, the network node 110*b* transfers the requested network resource to the network node 110*a* in accordance with the request (block 630). In some implementations, this enables one or more client devices of the first network node 110*a* to concurrently use (i) network resources that were originally associated with the first network node 110*a* and (ii) the network resources that were newly transferred from the second network node 110*b* to the first network node 110*a*.

After a period of usage, the exchange of network resources is terminated, and the network resources that were shared by the second network node 110*b* are returned to the second network node 110*b* (block 632). In some implementations, the exchange of network resources can be determined based on the initial request (e.g., the exchange of network resources can terminate upon the expiration of a time interval specified in the request). In some implementations, the exchange of network resources can be terminated based on a period of inactivity.

Upon the termination of the exchange of network resources, the first network node 110*a* transmits a confirmation of the termination to the decision module 304 (block 634). Further, the decisions module 304 stores information regarding the termination of the exchange of network resources on the distributed ledger (block 636).

In the example shown in FIGS. 6A and 6B, the service broker system 104*a* receives information from and/or transmits information to the network nodes 110*a* and 110*b* directly (e.g., without using any other service broker systems 104*b*-104*n* as intermediaries). However, in practice, the service broker system 104*a* can receive information from and/or transmit information to the network nodes 110*a* and 110*b* indirectly (e.g., via one or more other service broker systems 104*b*-104*n* as intermediaries).

FIG. 6C shows another example process 650 for managing a network using a distributed network management system. In some implementations, the process 650 can be performed by the system 100 described herein using one or more processors (e.g., using the processor or processors 710*a*-710*n* shown in FIG. 7).

In the process 650, a first computer system of a distributed network receives first data from a first network node (block 652). The distributed network includes the first computer system communicatively coupled to a first set of network nodes including the first computer system, and a second computer system communicatively coupled to a second set of network nodes The first data represents a request for additional network resources by the first network node.

The first computer system receives second data from the second computer system (block 654). The second data represents a first set of network resources available for sharing by a second network node from the second set of network nodes.

In some implementations, the first set of network resources can include access to a first wireless network for transmitting and/or receiving data.

In some implementations, the first set of network resources can include access to a first frequency spectrum for transmitting and/or receiving data using a wireless network.

The first computer system identifies, based on the first data and the second, at least a portion of the first set of network resources (block 656).

In some implementations, identifying at least the portion of the first set of network resources can include receiving a set of rules for exchanging network resources between the first network node and the second network node, and identifying at least the portion of the first set of network resources based on the set of rules.

In some implementations, the set of rules can include one or more rules pertaining to a geographical location.

In some implementations, the set of rules can include one or more rules pertaining to a time of day and/or a date.

In some implementations, the set of rules can be retrieved from a third computer system of the distributed network.

In some implementations, at least the portion of the first set of network resources can be identified based on prediction data. The prediction data can represent a predicted future demand for network resources by a first user device associated with the first network node.

In some implementations, the prediction data can be generated based on a predicted future location of the first user device and/or a predicted future availability of network resources.

The first computer system transmits, to the first network node and the second computer system, first transaction data representing a sharing of at least the portion of the first set of network resources by the second network node with the first network node (block 568).

The first computer system adds the first transaction data to a distributed ledger of the distributed network (block 570). In some implementations, the distributed ledger can include a blockchain.

In some implementations, the process 650 can include additional steps performed with respect to additional network nodes. For example, the first computer system can receive third data from the second computer system, the third data representing the first data representing a request for additional network resources by a third network node from the second set of network nodes. Further, the first computer system can receive fourth data from a fourth network node from the first set of network nodes, the fourth data representing a second set of network resources available for sharing by the fourth network node. Further, the first computer system can identify, based on the first data and the second, at least a portion of the second set of network resources. Further, the first computer system can transmit, to the fourth network node and the second computer system, second transaction data representing a sharing of at least the portion of the second set of network resources by the fourth network node with the third network node. Further, the first computer system can add the second transaction data to the distributed ledger.

Example Computer System

Figure 7:
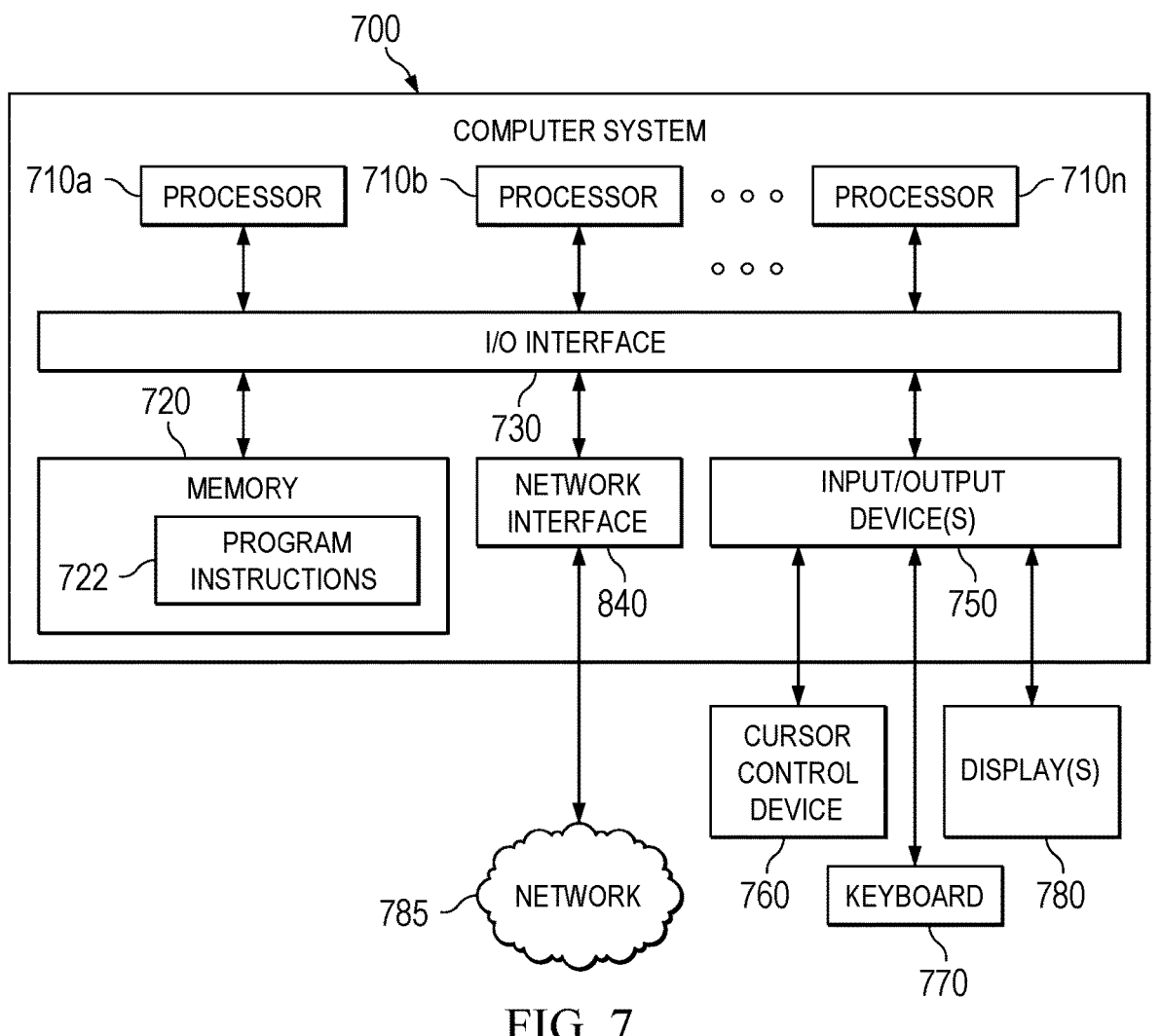
FIG. 7 is a diagram of an example computer system.

FIG. 7 illustrates an example computer system 700 that may implement any of the components described herein. The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a distributed network management system, as described herein may be executed in one or more computer systems 700, which may interact with various other devices. Note that any component, action, or functionality described above with respect to FIGS. 1-6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the ×86, PowerPC, SPARC, or MIPS ISAs, or any other suitable ISA. In multiprocessor systems, each of processors 810 may commonly, but not necessarily, implement the same ISA.

System memory 720 may be configured to store program instructions 722 and/or sensor data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions 722 may be configured to implement an image sensor control application incorporating any of the functionality described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 800 and may interact with one or more nodes of computer system 700 through a wired or wireless connection, such as over network interface 740.

As shown in FIG. 7, memory 720 may include program instructions 722, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
receiving, by a first computer system of a distributed network, first data from a first network node, wherein the distributed network comprises:
the first computer system communicatively coupled to a first set of network nodes including the first computer system, and
a second computer system communicatively coupled to a second set of network nodes, and
wherein the first data represents a request for additional network resources by the first network node,
receiving, by the first computer system, second data from the second computer system, the second data representing a first set of network resources available for sharing by a second network node from the second set of network nodes,
identifying, by the first computer system, and based on the first data and the second data, at least a portion of the first set of network resources,
transmitting, by the first computer system to the first network node and the second computer system, first transaction data representing a sharing of at least the portion of the first set of network resources by the second network node with the first network node, and
adding, by the first computer system, the first transaction data to a distributed ledger of the distributed network.

2. The method of claim 1, wherein the first set of network resources comprises access to a first wireless network for transmitting and/or receiving data.

3. The method of claim 1, wherein the first set of network resources comprises access to a first frequency spectrum for transmitting and/or receiving data using a wireless network.

4. The method of claim 1, wherein the distributed ledger comprises a blockchain.

5. The method of claim 1, wherein identifying at least the portion of the first set of network resources comprises:
receiving a set of rules for exchanging network resources between the first network node and the second network node, and
identifying at least the portion of the first set of network resources based on the set of rules.

6. The method of claim 5, wherein the set of rules comprises one or more rules pertaining to a geographical location.

7. The method of claim 5, wherein the set of rules comprises one or more rules pertaining to at least one of:
a time of day, or
a date.

8. The method of claim 5, wherein the set of rules is retrieved from a third computer system of the distributed network.

9. The method of claim 1, wherein at least the portion of the first set of network resources is identified based on prediction data, the prediction data representing a predicted future demand for network resources by a first user device associated with the first network node.

10. The method of claim 9, wherein the prediction data is generated based on at least one of:
a predicted future location of the first user device, or
a predicted future availability of network resources.

11. The method of claim 1, further comprising:
receiving third data from the second computer system, the third data representing the first data representing a request for additional network resources by a third network node from the second set of network nodes,
receiving fourth data from a fourth network node from the first set of network nodes, the fourth data representing a second set of network resources available for sharing by the fourth network node, identifying, based on the first data and the second data, at least a portion of the second set of network resources, transmitting, to the fourth network node and the second computer system, second transaction data representing a sharing of at least the portion of the second set of network resources by the fourth network node with the third network node, and adding the second transaction data to the distributed ledger.

12. A system comprising:

one or more processors; and memory storing instructions that when executed by the one or more processors, cause the one or more processors to perform operations comprising: receiving, by a first computer system of a distributed network, first data from a first network node, wherein the distributed network comprises:

the first computer system communicatively coupled to a first set of network nodes including the first computer system, and a second computer system communicatively coupled to a second set of network nodes, and wherein the first data represents a request for additional network resources by the first network node, receiving, by the first computer system, second data from the second computer system, the second data representing a first set of network resources available for sharing by a second network node from the second set of network nodes, identifying, by the first computer system, and based on the first data and the second data, at least a portion of the first set of network resources, transmitting, by the first computer system to the first network node and the second computer system, first transaction data representing a sharing of at least the portion of the first set of network resources by the second network node with the first network node, and adding, by the first computer system, the first transaction data to a distributed ledger of the distributed network.

13. A system comprising:

a distributed network comprising:

a first computer system communicatively coupled to a first set of network nodes, and a second computer system communicatively coupled to a second set of network nodes, wherein each of the network nodes of the first and second sets of network nodes is associated with a respective set of network resources, wherein the first computer system is configured to:

receive first data from a first network node from the first set of network nodes, the first data representing a request for additional network resources by the first network node, receive second data from the second computer system, the second data representing a first set of network resources available for sharing by a second network node from the second set of network nodes, identify, based on the first data and the second data, at least a portion of the first set of network resources, transmit, to the first network node and the second computer system, first transaction data representing a sharing of at least the portion of the first set of network resources by the second network node with the first network node, and add the first transaction data to a distributed ledger of the distributed network, and wherein the second computer system is configured to:

transmit the second data to the first computer system, receive the first transaction data from the first computer system, and cause at least the portion of the first set of network resources to be shared by the second network node with the first network node.

14. The system of claim 13, wherein the first set of network resources comprises access to a first wireless network for transmitting and/or receiving data.

15. The system of claim 13, wherein the first set of network resources comprises access to a first frequency spectrum for transmitting and/or receiving data using a wireless network.

16. The system of claim 13, wherein the distributed ledger comprises a blockchain.

17. The system of claim 13, wherein identifying at least the portion of the first set of network resources comprises:

receiving a set of rules for exchanging network resources between the first network node and the second network node, and identifying at least the portion of the first set of network resources based on the set of rules.

18. The system of claim 17, wherein the set of rules comprises one or more rules pertaining to at least one of a geographical location, a time of day, or a date.

19. The system of claim 13, wherein at least the portion of the first set of network resources is identified based on prediction data, the prediction data representing a predicted future demand for network resources by a first user device associated with the first network node.

20. The system of claim 19, wherein the prediction data is generated based on at least one of:

a predicted future location of the first user device, or a predicted future availability of the network resources.

* * * * *